United States Patent Office 3,006,942
Patented Oct. 31, 1961

3,006,942
RECOVERY OF BY-PRODUCT ALUMINUM AND PREPARATION OF ALUMINUM ALKYLS
John F. Nobis, Cincinnati, Ohio, assignor to National Distillers and Chemical Corporation, New York, N.Y., a corporation of Virginia
No Drawing. Filed July 11, 1957, Ser. No. 671,144
8 Claims. (Cl. 260—448)

The present invention relates to a novel process for utilization of by-product aluminum from a process wherein sodium is reacted with an alkylaluminum halide to produce the corresponding trialkylaluminum and a by-product comprising the corresponding halide of sodium and aluminum metal and which by-product may or may not comprise unreacted sodium depending upon whether an excess of sodium was utilized in the reaction between sodium and the alkylaluminum halide to prepare the trialkylaluminum.

More particularly, the invention relates to a process wherein an alkyl halide is reacted with aluminum to form an alkylaluminum halide or a mixture of monoalkylaluminum halide and dialkylaluminum monohalide, and (a) conversion of such aluminum compounds to the corresponding trialkylaluminum by reaction with sodium, preferably an excess of sodium, followed by removal of the resulting trialkylaluminum thereby leaving a by-product mass comprising a sodium halide and aluminum, or (b) conversion of the mixture of monoalkylaluminum dihalide and dialkylaluminum halide to dialkylaluminum halide by reaction with a trialkylaluminum. In the latter case, the dialkyl aluminum halide can be separated from the salt by distillation and the dialkylaluminum halide can be reacted with sodium to form the trialkylaluminum.

Such processes are illustrated by the following equations wherein the first of the aforesaid processes (a) is represented by Equations 1, 2 and 3 and the process (b) is represented by Equations 1, 2, 4 and 5. In the equations, R represents an alkyl group.

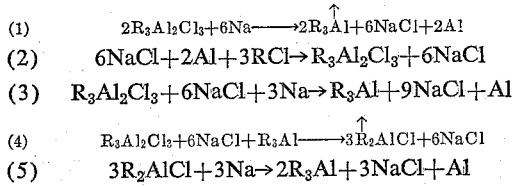

(1) $2R_3Al_2Cl_3 + 6Na \longrightarrow 2R_3Al\uparrow + 6NaCl + 2Al$
(2) $6NaCl + 2Al + 3RCl \rightarrow R_3Al_2Cl_3 + 6NaCl$
(3) $R_3Al_2Cl_3 + 6NaCl + 3Na \rightarrow R_3Al\uparrow + 9NaCl + Al$
(4) $R_3Al_2Cl_3 + 6NaCl + R_3Al \longrightarrow 3R_2AlCl\uparrow + 6NaCl$
(5) $3R_2AlCl + 3Na \rightarrow 2R_3Al + 3NaCl + Al$ Although in reactions utilizing sodium, they can be carried out using a quantity of sodium substantially stoichiometrically equivalent to that for conversion of the aluminum compound to trialkylaluminum, it is particularly suitable to employ an excess of sodium, such as up to about a 20% excess whereby, in addition to the sodium salt and aluminum, the by-product mass also contains sodium plus sodium complexes of the trialkylaluminum product.

As is apparent from the foregoing Equation 1, approximately one-half of the aluminum in the alkylaluminum halide reacted with sodium is utilized for conversion to the trialkylaluminum, whereby the by-product mass contains about one-half of the total amount of aluminum in alkylaluminum halide form originally present. Since such a substantial amount of aluminum by-product results in a substantial economic loss in the overall process, it is highly desirable to recover the aluminum by-product in a form useful in the overall process for ultimate conversion to trialkylaluminum. The primary object of this invention is the provision of a process whereby the by-product aluminum in the by-product mixture from the aforedefined process for trialkylaluminum preparation is recovered in a form suitable for conversion to an intermediate compound reactable with sodium for preparation of trialkylaluminum.

In accordance with this invention, a reaction mixture comprising an alkali metal halide and aluminum, such as that obtained from a reaction between sodium and an alkylaluminum halide to produce a trialkylaluminum, is subjected to reaction with an alkyl halide under conditions to convert the by-product aluminum in said reaction mixture to an alkylaluminum halide. The resulting mixture of alkylaluminum halide and alkali metal halide is suitable for reaction with sodium to prepare trialkylaluminum as per process (a) or as per process (b) as aforedescribed.

In aforedescribed reactions between sodium and an alkylaluminum halide, as for example alkylaluminum chlorides, the by-product mixture comprising sodium chloride and aluminum is in the form of finely divided colloidal solid particles and, as the sodium reaction is carried out under an inert atmosphere (e.g., $N_2$), the finely divided aluminum in the by-product mixture is of exceptional purity and substantially free of oxide. As a result, the aluminum is so active that a catalyst, a relatively high temperature and/or pressure is not required for the reaction to produce trialkylaluminum in the described sodium reactions. Illustrative of such processes for preparation of trialkylaluminum are those disclosed in co-pending applications, S.N. 634,819 and S.N. 634,820, filed January 18, 1957, which, respectively, relate to preparation of triethylaluminum and trimethylaluminum by reaction between sodium and the corresponding alkylaluminum chloride. Such processes, suitable for use herein, illustrate preparation of by-product mixtures, such mixtures comprising an alkali metal halide and aluminum, and from which the trialkylaluminum has been substantially removed.

In the use of such by-product mixtures, the mixtures are subjected to reaction with an alkyl halide, preferably corresponding to the halide of the by-product sodium salt. Thus, for by-product mixtures containing sodium chloride resulting from reaction between sodium and an alkylaluminum sesquichloride, the by-product mixture is treated with an alkyl chloride. The alkyl component of the halide, used for treatment of the by-product mixture, preferably corresponds to the alkyl component of the alkylaluminum halide used for the sodium reaction resulting in formation of the by-product mixture whereby, upon conversion of the aluminum in the by-product mixture to the corresponding alkylaluminum halide, the latter can be reacted with sodium to form the same trialkylaluminum as per process (a) or, in accord with process (b).

In reference to the particular reactions illustrated by the aforedescribed equations, similar conditions can be utilized for Reactions 1, 3 and 5 wherein alkylaluminum chlorides are reacted with sodium to form trialkylaluminum. Although the temperature employed for such reactions depends particularly on the particular alkylaluminum chloride employed as the reactant, illustrative temperatures are, for carrying out the reaction to prepare triethylaluminum from ethylaluminum chlorides, of temperatures above the melting point of sodium but below about 200° C. and, for preparation of trimethylaluminum from methylaluminum chlorides, temperatures up to about 250° C. For Equation 4, wherein the alkylaluminum sesquichlorides are reacted with trialkylaluminum to form dialkylaluminum chloride, the particular temperature employed may also be varied to meet the requirements of the particular sesquichloride employed but, generally, a temperature of from about room temperature up to about 150° C. may suitably be used. As for Equation 2, wherein the aluminum in the by-product mass is reacted with an alkyl halide to form alkylaluminum chloride, a temperature in the range of from about 90 to about 160° C. is generally used although somewhat lower or higher temperatures may be used depending, hereagain, on the particular reactants employed.

In order to further describe the invention, the following embodiments are set forth for purposes of illustration and not limitation. Such a by-product mixture was obtained from a series of reactions for preparation of methylaluminum sesquihalides and ethylaluminum sesquihalides and reactions thereof with sodium as per the following procedure:

Example 1

To a one liter, three-neck, round bottom flask equipped with a metal sweep stirrer, metal thermometer, condenser and gas inlet tube, the following was charged: 600 grams aluminum pellets and 0.1 mole of methyl aluminum sesquichlorides (catalyst). The stirred flask was externally heated to bring the temperature up to 90° C. and methyl chloride gas was charged into the flask through a calibrated rotameter. The reaction was very exothermic and a cooling bath was necessary to maintain the temperature between 90° C. and 120° C. Absorption of the methyl chloride was very rapid and feed rates varied between 0.2 l./minute to 0.6 l./minute depending upon the temperature. The percent absorption was determined from the measured "off-gases." The gas feed was continued until the reactor was full and then the product was pumped from the reactor through a screened decanting leg using dry nitrogen pressure. A production rate of 0.2 lb./hr. was realized. The yield was 91% based on methyl chloride charged and 95% based on aluminum used.

Analysis of the sesquichlorides showed the chloride content to be 51.6% (theory=52%); and the aluminum content 26% (theory=26.3%), thus indicating that the ratio of the methylaluminum chloride to dimethylaluminum chloride was about 1:1.

Three pounds of methylaluminum sesquichlorides were added slowly to one pound of sodium in a two gallon, jacketed, agitated reactor. When the addition was complete, the trimethylaluminum that had formed was separated from the by-product salt and aluminum by distillation at 120–125° C. The yield was 90%.

The remaining by-product bed containing 2.5 lbs. of salt and 0.4 lb. of aluminum was treated with excess methyl chloride. The reaction was highly exothermic and cooling was required to control reaction temperature at 120° C. An analysis of a portion of the reaction mixture showed that 90% of the aluminum metal theoretically present had been converted to methylaluminum sesquichloride. Excess sodium was added to the methylaluminum sesquichloride reaction mixture in small increments at 100–120° C. over a period of several hours. The reaction was very violent and distillation of product was prevented by application of cooling on the vessel walls and by using a reflux condenser. When sodium addition was complete, the condenser was replaced with a short distillation column and the 80% yield of trimethylaluminum separated by distillation.

Example 2

The apparatus consisted of a 1 liter 4 necked flask equipped with a metal thermometer, dropping funnel, metal sweep stirrer (driven by an air motor) and a claisen head fitted with a metal condenser and receiver. The entire system was under nitrogen.

Ethylaluminum sesquichloride (prepared similarly to the methylaluminum sesquichloride in Example 1) was flash distilled to remove metallic aluminum. A total of 487.7 g. (1.97 moles) of the ethylaluminum sesquichlorides were charged to the dropping funnel under nitrogen. To the clean, dry flask was charged 122.3 g. of sodium (5.34 g. atom). The flask was heated and the sodium melted. The sesquichlorides were charged dropwise onto the sodium over a period of 100 minutes maintaining an internal temperature of 120–171° C. with a Dry-Ice kerosene bath. When approximately 83% of the sesquichlorides had been added, the reaction mixture was a smooth slurry which became more fluid as all of the sesquichloride was added.

The crude triethylaluminum (164.5 grams, 73.5% of theoretical) was distilled from the reaction flask at 180° C. to 196° C. (pot temperature 191° C. to 234° C.).

| Analysis of triethylaluminum | Found | Calculated |
|---|---|---|
| Percent Al | 22.95 | 23.7 |
| Percent Cl | 0.5 | 0.0 |

The by-product salt-aluminum bed contained substantially the following theoretical amounts of oxide-free, colloidal aluminum and sodium chloride:

Grams
Colloidal, oxide-free aluminum_____ 53.2
Sodium chloride_____ 350.2

The dry NaCl—Al bed was heated to 100° C. with rapid stirring. Ethyl chloride gas (391 g.) was added to the reaction flask at a rate that caused little or no off gas (nitrogen having been removed from the system). External heat was removed when the temperature reached 100° C. The large heat of reaction required external cooling in order to keep reaction temperature between 100 and 150° C. Ethyl chloride feed rates varied from 2.2 l./min. (obtained with the high concentrations of approximately 53 grams of aluminum) to 0.12 l./min. as the concentration of aluminum decreased. Most rapid reaction was noted at 150–155° C.

In this run, triethylaluminum (0.89 mole; 101 grams) was slowly added to the ethylaluminum sesquichlorides obtained by reaction of ethyl chloride with the by-product aluminum. The temperature was maintained between 95–112° C. during the 18 minute addition period. A homogeneous liquid, milky grey bed was obtained. Heat was applied to separate the mono chloride by distillation. A total of 347 grams of water-white distillate boiling from 207 to 216° C. (pot temperature=214° C. to 231° C.) was obtained (99% yield based on by-product aluminum from the bed).

| Analysis of diethylaluminum chloride | Found | Calculated |
|---|---|---|
| Percent Al | 22.6 | 22.4 |
| Percent Cl | 29.2 | 29.5 |

The resulting diethylaluminum chloride, upon reaction with sodium by addition of the diethylaluminum chloride to sodium is converted to triethylaluminum in about 90% yield.

Although the various aforedescribed embodiments of the invention are suitable modes for practice of the invention, the embodiment described as process (b) is preferred. For example, in that process comprising the equations hereinbefore set forth as 1, 2, 4 and 5, there results in Equation 5, three parts of alkali metal chloride to one part of aluminum whereby a sufficient concentration of aluminum exists for its recovery by using the product of Equation 5 (e.g., NaCl+Al) for the reaction of Equation 2. On the other hand, in process (a) (Equations 1, 2 and 3) nine parts of alkali metal chloride to one part of aluminum is obtained (Equation 3) whereby the aluminum is so much more diluted (than in process (b)) that its substantially complete recovery becomes more difficult and practically less attractive.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. In a process for preparation of trialkylaluminum by (1) reacting an alkyl aluminum halide with an amount of sodium at least stoichiometrically sufficient to provide a reaction product mixture consisting essentially of trialkylaluminum and, as by-products, sodium halide and elemental aluminum, and (2) separating the trialkylaluminum from said product mixture thereby providing a by-product mixture of said sodium halide and elemental aluminum, the method for recovery and utilization of the by-product elemental aluminum in said by-product mixture which comprises (3) reacting the elemental aluminum in said by-product mixture with an amount of an alkyl halide at least stoichoimetrically sufficient to convert the by-product aluminum to a mixture of dialkylaluminum halide and monoalkylaluminum dihalide in the presence of sodium halide, and (4) subjecting the resulting mixture of mono- and di-alkyl aluminum halides in presence of sodium halide to reaction with an amount of sodium sufficient to convert a substantial amount of the aluminum content of said alkyl aluminum halides to trialkylaluminum to provide a reaction product mixture consisting essentially of said trialkylaluminum, sodium halide and aluminum.

2. A process, as defined in claim 1, wherein the trialkylaluminum is separated from the reaction product mixture of step (4) consisting essentially of trialkylaluminum, sodium halide and aluminum.

3. A process, as defined in claim 2, wherein the reaction product mixture of step (4), following removal of the trialkylaluminum, is recycled to step (3) for reaction with an alkyl halide to convert the by-product elemental aluminum to alkylaluminum sesquihalides.

4. In a process for preparation of trialkylaluminum by (1) reacting a mixture of alkylaluminum chlorides ($R_3Al_2Cl_3$) with at least three mols of sodium to provide a reaction product mixture consisting essentially of trialkylaluminum, sodium chloride and elemental aluminum in a molar ratio of 1:3:1, and (2) separating the trialkylaluminum from the product mixture of (1), the method for recovery and utilization of the by-product elemental aluminum in the product mixture of step (1) which comprises (3) reacting the by-product aluminum in the product mixture of step (1) with an amount of an alkyl halide sufficient to convert said by-product aluminum to a product mixture of alkylaluminum chlorides ($R_3Al_2Cl_3$) in presence of sodium chloride, and (4) subjecting the resulting product mixture of alkylaluminum chlorides in presence of sodium chloride to reaction with an amount of sodium sufficient to convert about one-half of the aluminum content of the alkylaluminum chlorides to trialkylaluminum and provide a product mixture of said trialkylaluminum in presence of sodium chloride and about one-half of the aluminum, as elemental aluminum, originally present in the alkylaluminum chlorides subjected to the reaction of step (4).

5. A process, as defined in claim 4, wherein the trialkylaluminum is separated from the product mixture of step (4) and the remaining product mixture consisting essentially of sodium chloride and elemental aluminum is recycled to step (3) for reaction with an alkyl halide.

6. In a process for preparation of trialkylaluminum by (1) reacting an alkyl aluminum halide with an amount of sodium at least stoichiometrically sufficient to provide a reaction product consisting essentially of trialkylaluminum and, as by-products, sodium halide and elemental aluminum, and (2) separating the trialkylaluminum from said reaction product thereby providing a by-product mixture of sodium halide and elemental aluminum, the method for recovery and utilization of the by-product elemental aluminum in said by-product mixture which comprises (3) reacting the by-product elemental aluminum in said by-product mixture with an amount of an alkyl halide at least stoichiometrically sufficient to convert the by-product aluminum to a mixture of dialkylaluminum monohalide and mono alkylaluminum dihalide in the presence of sodium halide, (4) subjecting the product mixture from step (3) to reaction with a trialkylaluminum in an amount sufficient to convert the monoalkylaluminum dihalide in the product mixture of step (3) to dialkylaluminum monohalide whereby there is obtained from step (4) a product mixture of dialkylaluminum monohalide and sodium halide, and (5) reacting the dialkylaluminum halide in the product mixture of step (4) with an amount of sodium sufficient to convert a substantial amount of said dialkylaluminum halide to trialkylaluminum.

7. A process, as defined in claim 6, wherein the product mixture from step (5) contains, in addition to trialkylaluminum, sodium halide and elemental aluminum, the trialkylaluminum is separated from said product mixture, and the sodium halide and elemental aluminum are recycled to step (3) for reaction with an alkyl halide.

8. In a process for preparation of trialkylaluminum by (1) reacting an alkyl aluminum chloride with an amount of sodium at least stoichiometrically sufficient to provide a reaction product consisting essentially of trialkylaluminum and, as by-products, sodium chloride and elemental aluminum, and (2) separating the trialkylaluminum from said reaction product thereby providing a by-product mixture of sodium chloride and elemental aluminum, the method for recovery and utilization of the by-product elemental aluminum in said by-product mixture which comprises (3) reacting the by-product elemental aluminum in said by-product mixture with an amount of an alkyl chloride at least stoichiometrically sufficient to convert the by-product aluminum to a mixture of dialkylaluminum monochloride and monoalkylaluminum dichloride in the presence of sodium chloride, (4) subjecting the product mixture from step (3) to reaction with a trialkylaluminum in an amount sufficient to convert the monoalkylaluminum dichloride in the product mixture of step (3) to dialkylaluminum monochloride whereby there is obtained from step (4) a product mixture of dialkylaluminum monochloride and sodium chloride, and (5) reacting the dialkylaluminum chloride in the product mixture of step (4) with an amount of sodium sufficient to convert a substantial amount of said dialkylaluminum chloride to trialkylaluminum.

References Cited in the file of this patent

UNITED STATES PATENTS

| | | |
|---|---|---|
| 2,270,292 | Grosse | Jan. 20, 1942 |
| 2,388,428 | Mavity | Nov. 6, 1945 |
| 2,691,668 | Ziegler et al. | Oct. 12, 1954 |
| 2,863,894 | Smith | Dec. 9, 1958 |